Dec. 2, 1947.  P. WHITE  2,431,784
QUESTIONNAIRE RECORDER
Filed Sept. 26, 1944  2 Sheets-Sheet 1
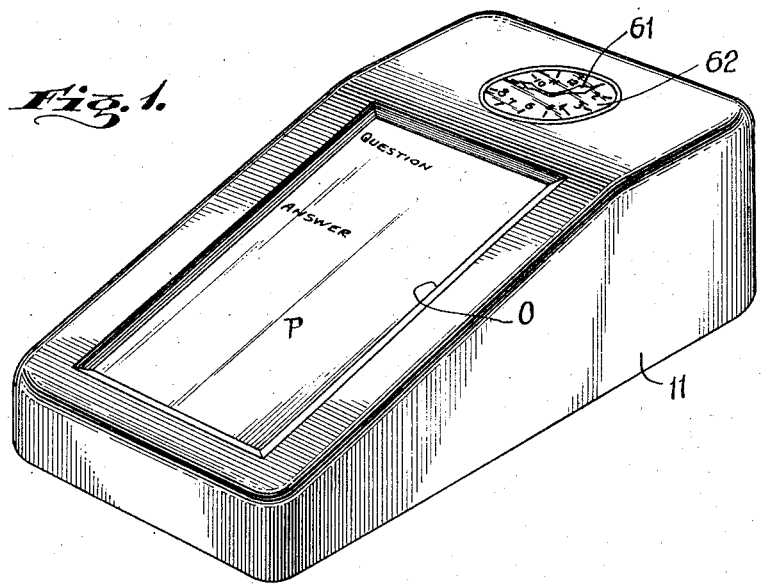
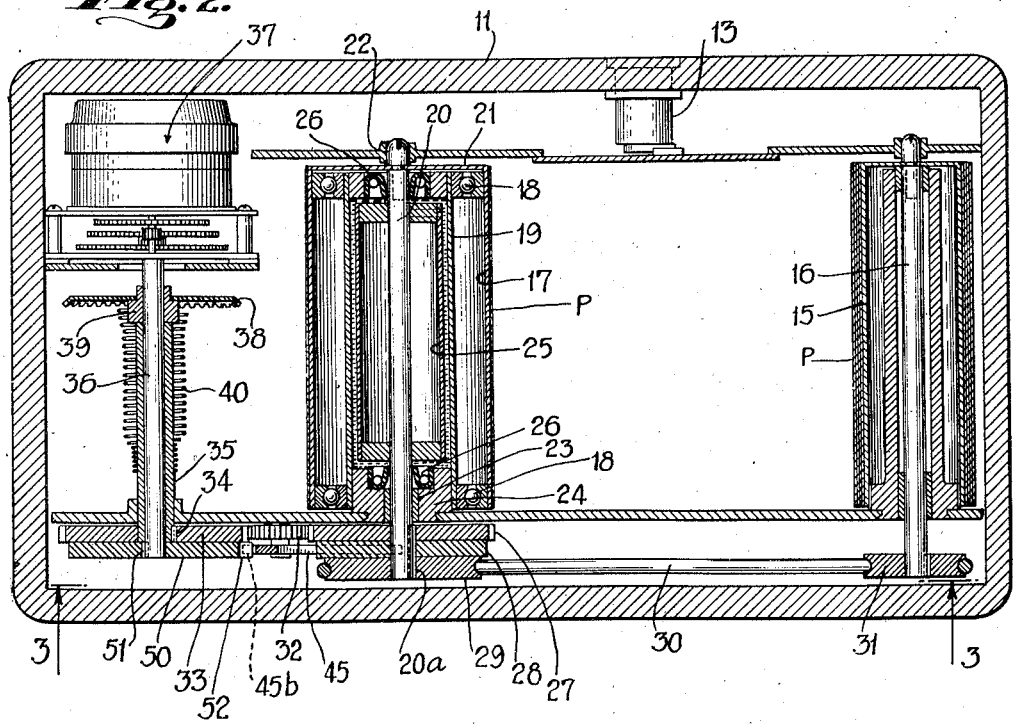
INVENTOR
Percival White
BY
A. H. Golden
ATTORNEY Dec. 2, 1947.  P. WHITE  2,431,784
QUESTIONNAIRE RECORDER
Filed Sept. 26, 1944   2 Sheets-Sheet 2
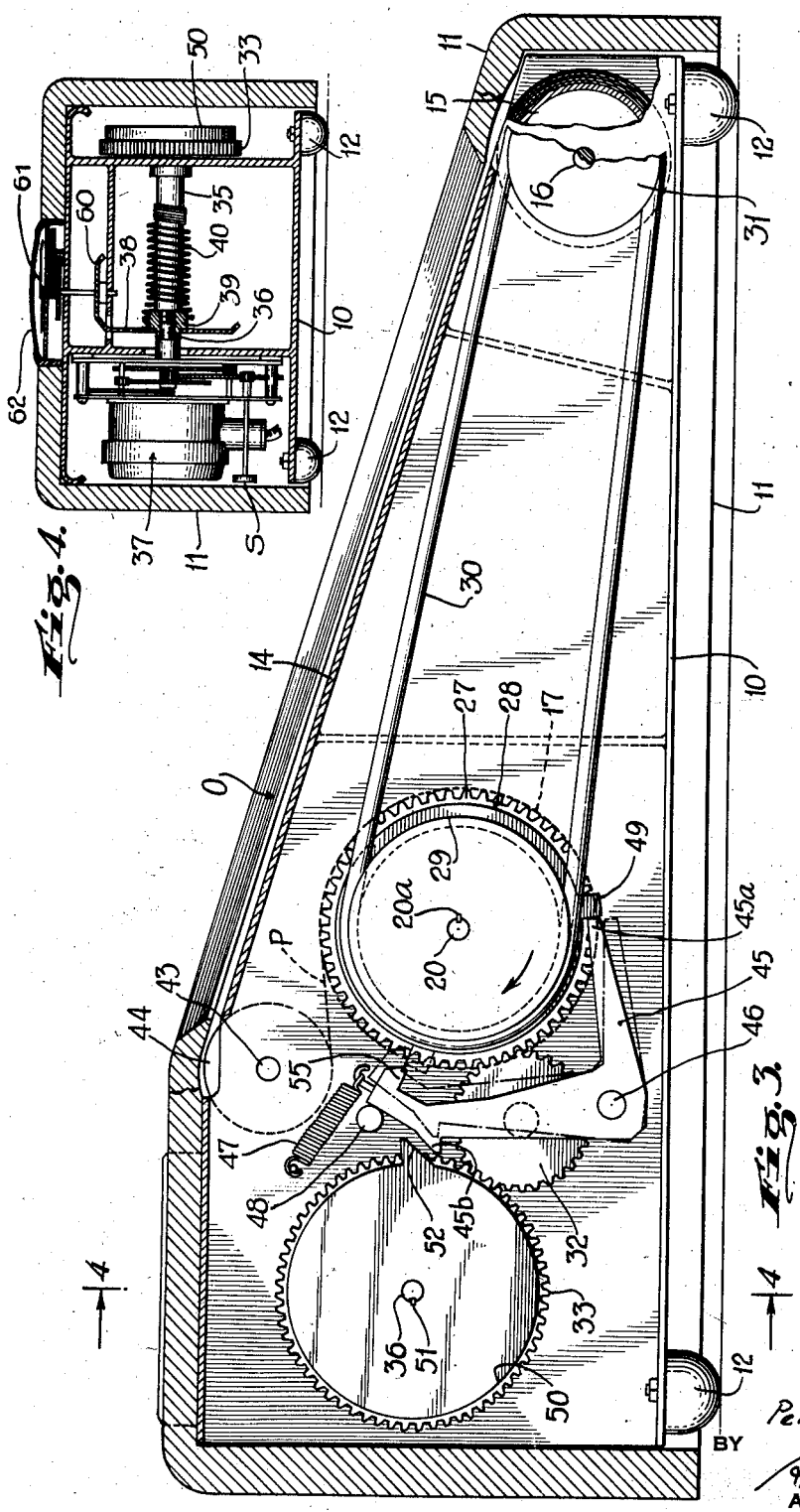
INVENTOR
Percival White
BY
A. H. Golden
ATTORNEY Patented Dec. 2, 1947

2,431,784

UNITED STATES PATENT OFFICE 2,431,784

QUESTIONNAIRE RECORDER

Percival White, Long Ridge, N. Y., assignor to Private Opinions, Inc., a corporation of New York Application September 26, 1944, Serial No. 555,871

7 Claims. (Cl. 161—1)

This invention relates to a device utilized for the recording of answers to questions presented for answer under predetermined conditions.

In recent years, research as to the buying and living habits of the general public has assumed more and more importance, until at the present time it has become relatively common practice to determine through research the possible reaction of the general public to motion pictures, political candidates, household products, and various other matters, all as is apparent to the average observer. As a general rule this research is accomplished by the asking of questions, the researcher writing down on a suitable form the answers to the questions. Frequently, the questions may be mailed to various individuals who will fill in the answers and then return the forms on which the questions are presented. It frequently becomes desirable to propound to a single individual or to a household a series of questions to be answered at spaced time intervals as, for example, morning and night, for the duration of a week. It is preferable in this type of research that the question and answer, once the answer is recorded, be withdrawn and made unavailable for either reference or change.

My invention contributes to the art a mechanical mechanism whereby a questionnaire containing a series of questions may be presented to an individual at spaced time intervals for answer by him, and with both the questions and answers thereafter withdrawn from access either for the purposes of reference or for the purposes of change.

One feature whereby the results set forth are contributed by my invention, resides in the utilization of a casing having a platen over which a paper sheet is drawn, the casing having an opening whereby written matter may be manually applied to the paper over the platen. A further feature of my invention resides in the control of the paper moving means whereby said paper moving means are moved through the operation of a continuously moving time mechanism, it being preferred that the time mechanism release the paper moving means for periodic movement. As a further feature of this portion of my invention the paper feeding means are maintained stationary except when released for said periodic movement.

I have thus described generally my invention and the more important features thereof in order that the nature of my contribution to the art may be better appreciated. In addition to the features I have herein generally set forth, there are other and more detailed portions of my invention that I shall hereinafter describe and also include in the claims appended hereto. Naturally, my invention need not necessarily incorporate particular details shown and described by me hereinafter, so that my invention should therefore not be limited to the particular apparatus that I prefer to utilize.

Referring now to the drawings, Fig. 1 is a perspective view of my invention; Fig. 2 is a horizontal section therethrough. Fig. 3 is a vertical section of my invention taken generally along lines 3—3 of Fig. 2 and Fig. 4 is a section taken along lines 4—4 of Fig. 3.

Referring now more particularly to the drawings, reference numeral 10 indicates the base member or base casting of the casing, while the outer casing portion is indicated by reference numeral 11. Secured to the base 10 are a series of rubber bumpers 12 whereby the casing may be supported on any surface such as a desk or table. The two casing portions 10 and 11 are secured to one another by any type of lock mechanism designated generally by reference numeral 13 in Fig. 2, it being the purpose of the lock to prevent access to the apparatus or the paper on which the questionnaire is presented.

The platen to which I have already alluded is indicated by reference numeral 14 and is best shown in Fig. 3. Platen 14 is preferably formed as part of the base 10 and is positioned under the opening O of casing portion 11. The paper P is run over this platen between a supply roll and a take-up roll, the take-up roll being shown at 15 mounted for rotation on a shaft 16 supported in the base 10 of the casing. Any suitable take-up roll may be utilized and it is merely necessary that it be so mounted that it may rotate with shaft 16 as the paper is drawn downwardly on the platen 14. The supply roll on which the paper is initially wound and from which it moves down the platen 14, is designated by reference numeral 17 and is mounted for rotation on ball bearings 18 relatively to a stationary tube whose outer surface is designated by reference numeral 19. Rotation is imparted to the roll 17 by a shaft 20 keyed to the end plate 21 secured as an integral part of the roll 17. It is well to indicate that a guide roll 44, mounted for rotation on a shaft 43, serves to guide the paper from the roll 17 to the platen 14. Shaft 43 is of course suitably mounted on base casting 10.

Shaft 20 is mounted for rotation at one end in bearing 22 formed in the base 10 and at its other end is supported in the base through the intermediary of a bushing 23 and a sleeve block 24. Keyed also to the shaft 20 is a hollow roller 25 that rotates within the tube 19. A heavy viscose fluid is confined in the space between the outer surface of the hollow roller 25 and the tube 19, suitable shaft seals 26 being utilized for preventing the escape of this fluid. It is the purpose of the fluid to slow down rotation of the shaft 20 and its roller 25 and paper supply roll 17 whenever the shaft 20 is rotated, as will presently be made apparent.

Keyed by key 20a to the shaft 20 is a gear 27, a cam 28 and a pulley 29. A leather belt 30 runs over the pulley 29 and a pulley 31 secured to shaft 16. It is, of course, the purpose of this arrangement to drive the shaft 16 and hence the take-up roll 15 whenever supply roll 17 is rotated.

The gear 27, as is best apparent from Fig. 3, is in driven relation to a pinion 32 mounted on the base 10, the pinion 32 being in turn driven by a gear 33 keyed at 34 to a sleeve 35. The sleeve 35 is in turn mounted for rotation about the drive shaft 36 of a synchronous time movement designated generally by reference numeral 37. Keyed to the shaft 36 is the bevel gear 38 through its central bearing block 39. A spring 40 is secured at one end to the block 39 and at its other end to the sleeve 35, and is adapted to be wound and placed under tension through rotation of the gear 38 and the block 39. It is, of course, the function of the spring 40 to rotate the gear 33, pinion 32, gear 27 and paper take-up roll 17 whenever the take-up roll is free to rotate.

Roll 17 is preferably adapted for rotation only at periodic predetermined intervals. For the particular purpose, I utilize the cam 28 to which I have heretofore alluded. This cam, it will be recalled, is keyed to the shaft 20 so that the shaft 20 may not rotate unless the said cam is free to rotate. For controlling the cam, I utilize a lever 45 pivoted at 46 on the base 10 and pressed by a spring 47 in a counterclockwise direction about the said pivot 46 and toward a limit pin 48, as is apparent in Fig. 3. The cam disk 28 is formed with a lug 49 opposite which is normally stationed the foot 45a of lever 45 for preventing rotation of the cam disk 28 and shaft 20. The lever 45 is rotatable to its dash and dotted line position of Fig. 3 by a disk 50 that is keyed at 51 to the continuously rotating synchronous timer shaft 36. A cam 52 on the disk 50 cooperates with the cam lug 45b of the lever 45 and urges it into the said dash and dotted line position once in each revolution of disk 50. This revolution may take place during any desired interval, depending upon the construction of the timer mechanism. It is, of course, obvious that a disk having more than one cam 52 may be utilized if that be desired.

When the lever 45 is in its dash and dotted line position, the foot 45a is withdrawn from blocking relation to lug 49 of cam disk 28 so that the cam disk 28 together with the shaft 20 and the supply roll 17 may rotate to move the paper from the supply roll 17 over the guide roll 44 and downwardly on platen 14, all as is quite apparent. This movement will be under the control of the fluid maintained between the roller 25 and the tube 19 as has already been made apparent.

This movement of the shaft 20 and cam disk 28 will bring the lug 49 opposite the hook portion 55 of the lever 45 whereby to stop the rotation of the shaft 20. As soon as the cam 52 passes beyond the cam lug 45b of lever 45, the said lever will, of course, return to its full line position of Fig. 3 and the shaft 20 together with the cam disk 28 and lug 49 will be allowed to complete rotation to the initial full line position illustrated in Fig. 3. It is, of course, apparent that during the predetermined interval a fresh sheet of paper is presented through the opening O of the casing cover 11 so that written matter may be applied to the paper P in answer to the particular question or questions that may be presented on the paper during the particular interval. If desired, the question to be answered may be made to appear during the relatively short period the timer requires to move cam 52 beyond cam lug 45b after contacting the said cam lug 45b.

It may be well at this point to emphasize that the constant rotation and operation of the timer 37 is utilized for the storing of energy within the spring 40 for feeding the paper P, while the same rotation is utilized for the periodic release of the paper feeding mechanism so that the paper may actually be moved. It will further be well to note that the timer may always be set by a setting mechanism S shown in Fig. 4 in the event some correction is required. Also, the bevel gear 38 that is rotatable with the bearing block 39 is in geared relation to a further bevel gear 60 that actuates a time indicating mechanism 61. It is, of course, possible to view the indicating hands of this time mechanism through the glass 62 as is best apparent in Fig. 1.

It may now be helpful to review one cycle of operation of my invention. Continuous rotation of the synchronous timer 37 effects a continuous rotation of the gear 38 and its bearing block 39 as well as the main shaft 36. The rotation of the bearing block 39 effects the tensioning of the spring 40 that is secured at one end to the bearing block 39 and at its other end to the sleeve 35. Sleeve 35 has keyed thereto at 34 the gear 33 and tends to rotate that gear, the pinion 32 and the gear 27 to feed the paper because the gear 27 is keyed to the shaft 20 to which the cam 28 is also keyed. The lever 45 prevents feeding of the paper until the said lever is moved from its full line position of Fig. 3 to its dash and dotted line position. This movement of the lever 45 is effected periodically by the cam 52 and a disk 50 keyed to the timer shaft 36. Upon release movement of the lever 45 the paper will be fed forward from the supply roll 17, this feeding taking place in two steps through the action of the hook portion 55 of the lever 45. The person having the device in his possession will then answer the question or questions printed on the paper P, utilizing for this purpose the opening O in the casing cover 11 and the platen portion 14. If desired, he may also answer a question appearing after the first and relatively short movement of the paper effected during the movement of lever 45 to its dash and dotted line position of Fig. 3.

I now claim:

1. In a combination of the class described, a casing, paper moving means for feeding paper relatively to parts of said casing at predetermined intervals, a continuously moving time mechanism having a continuously moving part, energy storing mechanism energized by said time mechanism, means whereby said energy storing mechanism actuates said paper moving means at a speed independent of said time mechanism, detent means blocking operation of said paper moving means, and means whereby said continuously moving part of said time mechanism releases said paper moving means from said detent means for movement by said energy storing mechanism at said predetermined intervals, said same continuously moving part effecting also the movement of said detent means to block operation of said paper moving means.

2. In a combination of the class described, a casing, paper moving means for feeding paper relatively to parts of said casing in predetermined cycles, a continuously moving time mechanism, energy storing mechanism energized by said time mechanism, means whereby said energy storing mechanism actuates said paper moving means at a speed independent of said time mechanism, means whereby said time mechanism releases said paper moving means for movement at the beginning of a predetermined cycle, means whereby said time mechanism stops said paper moving means at an intermediate point in each cycle, and thereafter releases said paper moving means for movement to a position corresponding to its position at the beginning of the next cycle.

3. In a combination of the class described, a casing having an opening, a platen in said casing positioned under said opening and over which paper is drawn for the manual application of written matter through said opening in said casing, paper moving means for feeding paper over said platen at predetermined intervals, a continuously moving time mechanism having a continuously moving part, energy storing mechanism energized by said time mechanism, means whereby said energy storing mechanism actuates said paper moving means at a speed independent of said time mechanism, detent means adapted for contact with a part of said paper moving means for blocking operation thereof, and means whereby said continuously moving part of said time mechanism releases said paper moving means from said detent means for movement by said energy storing mechanism at said predetermined intervals and thereafter effects the blocking of said paper moving means.

4. In a combination of the class described, a casing having an opening, a platen in said casing positioned under said opening and over which paper is drawn for the manual application of written matter through said opening in said casing, paper moving rolls for feeding paper over said platen at predetermined intervals a continuously moving time mechanism, a spring, winding mechanism for said spring, means whereby said spring actuates said paper moving rolls, means of connection between said spring winding mechanism and said continuously moving time mechanism whereby said time mechanism winds said spring, a detent cooperable with a part of said paper moving rolls for blocking rotation of said paper moving rolls, and a cam mechanism whereby said time mechanism releases said paper moving rolls from said detent for movement by said spring.

5. In a combination of the class described, a casing, paper feeding means in said casing, a continuously moving time mechanism, energy storing means, means whereby said energy storing means is driven by said time mechanism to store energy therein, means whereby said energy storing means actuates said paper feeding means at a speed independent of said time mechanism, a movable dog mounted in said casing having two detent surfaces, detent means forming part of said paper feeding means and cooperable with the detent surfaces of said dog to block actuation of said paper feeding means by said energy storing means in two positions of said paper feeding means, and a cam movable continuously by said time mechanism for moving said dog whereby to move said two detent surfaces into and out of blocking relation to said detent means forming part of said paper feeding means.

6. In a combination of the class described, a casing, paper feeding means in said casing, a continuously moving time mechanism, energy storing means, means whereby said energy storing means is driven by said time mechanism to store energy therein, means whereby said energy storing means actuates said paper feeding means at a speed independent of said time mechanism, a movable dog mounted in said casing, a lug secured to a part of said paper feeding means and cooperable with said dog to block actuation of said paper feeding means by said energy storing means, and a cam movable continuously by said time mechanism for moving a part of said dog out of blocking relation to said cam lug while bringing a second part of said dog into position to block said lug after movement of said lug a predetermined degree, said continuously moving cam then effecting movement of said dog to its initial position to allow movement of said lug to its initial position in blocked relation to said dog.

7. In a combination of the class described, a casing, paper feeding means in said casing, a continuously moving time mechanism, energy storing means, means whereby said energy storing means is driven by said time mechanism to store energy therein, means whereby said energy storing means actuates said paper feed-in means at a speed independent of said time mechanism, a dog pivoted in said casing and having two spaced detent portions, a lug secured to a rotating part of said paper feeding means, a spring pressing said dog so that one of its detents blocks rotation of said lug, a continuously rotatable cam movable by said time mechanism and adapted at a zone in its rotation to move said dog against said spring pressure so as to release said lug and paper feeding part for rotation beyond said one dog detent and to bring said lug against the other detent portion of said dog, said cam then releasing said dog for movement to its initial position whereupon said lug is released from said second detent portion for movement against the first detent of said lug.

PERCIVAL WHITE.

REFERENCES CITED

The following references are of record in the file of this patent:

UNITED STATES PATENTS

| Number | Name | Date |
| --- | --- | --- |
| 1,954,212 | Lawlor et al. | Apr. 10, 1934 |
| 1,879,641 | Sunkenberg et al. | Sept. 27, 1932 |
| 1,759,409 | Lassiter | May 20, 1930 |
| 1,942,409 | Carver et al. | Jan. 9, 1934 |
| 2,109,535 | Jones | Mar. 1, 1938 |
| 2,106,042 | Stark | Jan. 18, 1938 |
| 2,224,609 | Plym et al. | Dec. 10, 1940 |
| 1,978,973 | Whitehead et al. | Oct. 30, 1934 |
| 2,209,858 | Steiert | July 30, 1940 |